(12) United States Patent
Raz et al.

(10) Patent No.: US 8,682,572 B2
(45) Date of Patent: Mar. 25, 2014

(54) METHOD AND DEVICE FOR EVALUATING VEHICLE'S FUEL CONSUMPTION EFFICIENCY

(75) Inventors: Ofer Raz, Jerusalem (IL); Oren Musicant, Tel Aviv (IL)

(73) Assignee: Greenroad Driving Technologies Ltd., Beit Dagan (IL)

( * ) Notice: Subject to any disclaimer, the term of this patent is extended or adjusted under 35 U.S.C. 154(b) by 570 days.

(21) Appl. No.: 12/915,199

(22) Filed: Oct. 29, 2010

(65) Prior Publication Data

US 2011/0166773 A1    Jul. 7, 2011

(51) Int. Cl.
*G07C 5/02* (2006.01)
(52) U.S. Cl.
USPC .......................................... 701/123; 340/439
(58) Field of Classification Search
USPC .......................................... 701/123; 340/439
See application file for complete search history.

(56) References Cited

U.S. PATENT DOCUMENTS

| 7,389,178 | B2 | 6/2008 | Raz et al. | |
| 2004/0093264 | A1 | 5/2004 | Shimizu | |
| 2007/0027593 | A1 | 2/2007 | Shah et al. | |
| 2007/0143002 | A1* | 6/2007 | Crowell et al. | 701/123 |
| 2007/0247291 | A1 | 10/2007 | Masuda et al. | |
| 2008/0122603 | A1* | 5/2008 | Plante et al. | 340/439 |
| 2008/0295586 | A1 | 12/2008 | Fosseen | |
| 2009/0099724 | A1 | 4/2009 | Kranz et al. | |
| 2010/0090818 | A1* | 4/2010 | Sekiyama et al. | 340/439 |
| 2010/0106352 | A1* | 4/2010 | Skaff et al. | 701/22 |
| 2011/0090075 | A1* | 4/2011 | Armitage et al. | 340/439 |
| 2011/0133921 | A1* | 6/2011 | Harumoto et al. | 340/439 |

FOREIGN PATENT DOCUMENTS

EP    1 973 078 A1    9/2008

* cited by examiner

*Primary Examiner* — Khoi Tran
*Assistant Examiner* — Ryan Rink
(74) *Attorney, Agent, or Firm* — Dekel Patent Ltd.; David Klein

(57) ABSTRACT

A method is provided for evaluating fuel consumption efficiency of a vehicle driven by a driver. The method comprises the steps of: a) collecting data associated with said driver's driving performance from a plurality of sensors comprised in the vehicle; b) identifying a plurality of driving events based on the collected data; c) estimating the driver's performance in at least one driving event from among the identified plurality of driving events, wherein that at least one event if poorly performed is associated with increased fuel consumption; and d) based on the estimated driver's performance of the at least one driving event, evaluating a fuel consumption efficiency of the vehicle driven by that driver.

13 Claims, 4 Drawing Sheets

METHOD AND DEVICE FOR EVALUATING VEHICLE'S FUEL CONSUMPTION EFFICIENCY

FIELD OF THE INVENTION

The present invention relates to a method and system for monitoring vehicle performance, and in particular to a method for evaluating vehicles' fuel consumption.

BACKGROUND OF THE INVENTION

During recent decades it has been realized that oil is a limited resource, and when taken together with the global political map and the fact that there are few countries that control the whole world's oil supply, the dramatic fluctuations in the oil barrel prices become somewhat understandable. On top of the high costs involved in maintaining fuel powered vehicles, the environment is also severely damaged by the ever growing excessive use of fuel powered vehicles. Although that many alternative green energy vehicles are available in the market nowadays (hybrid vehicles, natural gas vehicles, solar powered vehicle etc.), still none of them may be considered to have a substantial impact upon the vehicles' market which is almost fully dominated by fuel powered vehicles, and it is likely that this fact is not about to change in the near future. Improving fuel consumption of the various vehicles is also quite an issue for the engineers who design new vehicles as they strive to improve the vehicles' performance, where fuel consumption is one of the parameters considered by the potential purchasers of vehicles. Thus, the obvious approach to improve fuel consumption is by improving the engine efficiency thereby improving the vehicle's MPG (miles per gallon). However, another approach to achieve that goal is to improve the driving performances of the drivers who drive the vehicles. It has already been demonstrated that the manner at which a driving session is carried out by the driver has quite an impact upon the vehicle fuel consumption.

Thus, there are a number of prior art solutions that were suggested in order to allow monitoring fuel consumption of vehicles.

For example, US 2007027593 describes a system and method for monitoring fuel efficiency of a vehicle. According to this solution the fuel efficiency of a vehicle is monitored in real-time using telemetry transmitted from the vehicle. The telemetry may be analyzed in combination with a fuel efficiency model in order to determine whether the real-time fuel efficiency determination deviates from a baseline fuel efficiency. The fuel efficiency model may further be used to assign vehicles in a fleet to particular routes, vehicles to particular drivers, or vehicles to particular routes with particular drivers.

US 2008295586 describes an apparatus for real-time monitoring of fuel consumption of a vehicle. The apparatus includes a fuel sensor which is in communication with a data tracker. The fuel consumption information is sent to a remote monitoring network, where reports detailing fuel consumption are generated. The fuel consumption data provides a user with information about hourly fuel usage, average horse power, operator performance, the location etc.

Another solution is suggested by US 20090099724 which discloses systems and methods for monitoring vehicle efficiency by using wireless remote sensors associated with the vehicle and with a fueling station. Vehicle data is collected from the wireless sensors in conjunction with fueling of the vehicle. Efficiency is determined by calculating the miles per gallon for a vehicle, and stored in a computing system. The vehicle efficiency can be tracked over time to identify deviations or irregularities that may be addressed to improve overall vehicle efficiency for a fleet of vehicles that are all monitored in such a manner.

EP 1973078 discloses a method to enable an improvement in the driving efficiency of a vehicle by providing various indications to the driver of the vehicle. The indications are based on comparison of parameters that were recorded during previous drives of the very same route either by the current vehicle or by other vehicles, with currently recorded parameters, and using this comparison to provide indications to a driver of the vehicle reflecting an improvement/worsening of the driving efficiency. However, this publication does not teach the linkage between individual driving events taken by the driver and their impact upon the vehicle's fuel consumption.

US 2004093264 describes an Eco-Driving diagnostic system capable of quantitatively comprehending fuel consumption with respect to each event and environmental-load emissions owing to the fuel consumption. An in-vehicle device that acquires from the vehicle's sensor information necessary to comprehend fuel consumption and driving statuses of the vehicle. The information is transmitted to a center via a radio communication network. On the basis of the acquired information, fuel consumption owing to the vehicle's driving and environmental-load emissions owing to the fuel consumption are calculated.

US 2007247291 discloses a vehicle display device which can display fuel consumption information of a vehicle in a useful and optimum mode for a driver. A fuel consumption meter calculates an instantaneous fuel consumption of a vehicle based on a mileage and a fuel injection quantity within a set time, calculates an average fuel consumption of the vehicle based on respective cumulative values of the mileage and the fuel injection quantity repeatedly calculated for every set time, and displays the deviation of the instantaneous fuel consumption with respect to the average fuel consumption as fuel consumption information on a fuel consumption meter.

All of above publications try to solve a similar problem as does the present invention, to lead eventually to a decrease in fuel consumption, but all of them fail to provide an adequate solution to the problem at hand.

SUMMARY OF THE INVENTION

It is therefore an object of the present invention to provide a method for evaluating the fuel consumption efficiency of a driver based on his driving performance.

It is another object of the present invention to provide the driver of a vehicle with real-time fuel-related feedback information during the trip (i.e. during a driving session).

It is another object of the present invention to enable the driver of the vehicle to improve his MPG (miles per gallon).

It is still another object of the present invention to provide the driver of the vehicle with means to monitor his driving performance and fuel consumption over a time period, thereby to enable him to identify and improve bad habits.

It is yet another object of the present invention to enable evaluating the vehicle's fuel consumption based on the true conditions under which the vehicle is/was driven.

Other objects of the present invention will be further described as the description of the invention proceeds.

Thus, according to a first embodiment of the present invention, a method is provided for evaluating fuel consumption efficiency of a vehicle driven by a driver, wherein the method comprises the steps of:

a. collecting from a plurality of sensors comprised in the vehicle, data associated with the driver's driving performance;

b. identifying a plurality of driving events based on the data collected;

c. estimating the driver's performance associated with at least one driving event from among the identified plurality of driving events, wherein that at least one event if poorly performed, would cause increased fuel consumption; and d. based on the estimated driver's performance of the at least one driving event, evaluating a fuel consumption efficiency of the vehicle driven by the driver.

The term "driving event" as used herein throughout the specification and claims is used to denote events which are controlled (in one way or the other) by the performance of the driver. Such events could be on one hand events that are expressed in a way that may visually be observed when the vehicle is being driven such as braking, turning, accelerating, etc., and on the other hand events like driving the vehicle under high rpm, timing of gear shifting and the like.

Examples of the fuel consumption evaluation process are described in length under the section entitled "detailed description". Basically the process involves identifying certain driving events that were carried out by the driver, and using pre-determined criteria to evaluate how well these driving events were carried out, thereby reflecting upon the vehicle's fuel consuming efficiency. As the driving session proceeds, more driving events are identified and the fuel consumption efficiency based on these newer driving events is further evaluated. Based on the evaluation of the way these various driving events were carried out, while knowing a priori their impact (i.e. their weighted effect) upon the vehicle's fuel consumption, the method provided by the present invention enables to determine the driver's fuel consumption efficiency based upon his driving performance. Preferably the weights of the various driving events are based upon the driver's own performance. In other words, the driving events' weights express the impact of each of these events upon the vehicle's fuel consumption when the vehicle is being driven by that specific driver, rather than deriving the driving events' weights by averaging fuel consumption performance exhibited when certain driving events are carried out by a large number of drivers.

According to another preferred embodiment of the invention, the method further comprises the step of:

e. providing the driver with real-time information associated with the vehicle's fuel consumption based on the driver's performance.

In accordance with yet another preferred embodiment of the present invention, the step of evaluating the fuel consumption efficiency of the vehicle driven by the driver, takes into consideration data associated with a location and/or time and/or traffic condition and/or weather condition at which the at least one driving event took place. One obvious advantage of this embodiment of the invention is that it allows considering the various driving events in their right perspective, based on the environment at which they were carried out. For example, if the driving event is driving along a straight road and it is found that the event is carried out at a low speed which in turn is associated with high fuel consumption, still, if it is found that this low speed is due to heavy traffic at the location where the driver was driving, the fact that the event was carried out in a way that is wasteful fuel-wise may be canceled out so that it would have no impact upon the driver's fuel consumption efficiency, as there was no other way to carry out that driving event. Other examples for data that should preferably be taken into consideration when evaluating the fuel-consumption efficiency are: weather updates, traffic updates, speed limits etc.

By still another embodiment of the invention, the at least one driving event is a member selected from a group consisting of: braking, braking while reaching a turn, accelerating, turning, acceleration while reaching a turn, acceleration while driving in a turn, braking while driving in a turn, sudden braking in a turn, accelerating while exiting a turn, braking while exiting a turn, lane crossing, braking profile, high rpm at which the vehicle is driven, timing of gear shifting and the like, or any combination thereof.

In accordance with yet another embodiment of the invention, the method further comprises the steps of storing the evaluated fuel consumption efficiency of the vehicle driven by the driver, and providing the driver with one or more recommendations regarding his driving performance based on the fuel consumption efficiency that had been stored. The provisioning of the data analysis and/or one or more recommendations may be carried out at the vehicle's display, at a web site, or any other method known in the art per se.

According to another aspect of the present invention there is provided a device for evaluating fuel consumption efficiency of a vehicle driven by a driver, which comprises:

a. a plurality of sensors comprised in the vehicle, adapted to collect data associated with the driver's driving performance; and b. a processor adapted to:

(i) identify a plurality of driving events based on the data collected;

(ii) estimate the driver's performance in at least one driving event associated with increased fuel consumption from among the plurality of identified driving events; and (iii) evaluate the fuel consumption efficiency of the vehicle driven by the driver.

Preferably, the device further comprising a transceiver adapted to receive information associated with the vehicle fuel consumption.

By still another embodiment, of this aspect of the invention the device further comprises a display means to enable providing the driver with real time feedback that relates to the vehicle fuel consumption based on the driver's driving performance.

Preferably, the at least one driving event is a member selected from a group consisting of: braking, braking while reaching a turn, accelerating, turning, acceleration while reaching a turn, acceleration while driving in a turn, braking while driving in a turn, sudden braking in a turn, accelerating while exiting a turn, braking while exiting a turn, lane crossing, braking profile, high rpm at which the vehicle is driven, timing of gear shifting, or any combination thereof.

According to another embodiment, the device further comprises storage means for storing the evaluated fuel consumption efficiency of the vehicle driven by the driver, and wherein preferably the processor is further adapted to provide one or more recommendations regarding the driver's driving performance based on the fuel consumption efficiency that had been stored.

By still another aspect of the invention there is provided a computer program product encoding a computer program stored on a non-transitory computer readable storage medium for executing a set of instructions by a computer system comprising one or more computer processors for carrying out a process for evaluating fuel consumption efficiency of a vehicle driven by a driver, and comprising the steps of:

collecting data associated with the driver's driving performance from a plurality of sensors comprised in the vehicle;

identifying a plurality of driving events based on the collected data;

estimating the driver's performance in at least one driving event from among the identified plurality of driving events, wherein that at least one event when poorly performed, is associated with increased fuel consumption; and based on the estimated driver's performance of the at least one driving event, evaluating a fuel consumption efficiency of the vehicle driven by the driver.

According to a preferred embodiment of this aspect of the invention, the set of instructions further comprising instructions to provide the driver with real-time information associated with the vehicle's fuel consumption based on the driver's performance.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

The principles and operation of the method, device and system according to the present invention may be better understood with reference to the accompanying drawings and the following description that illustrate some specific non-limiting examples of preferred embodiments.

Figure 1:
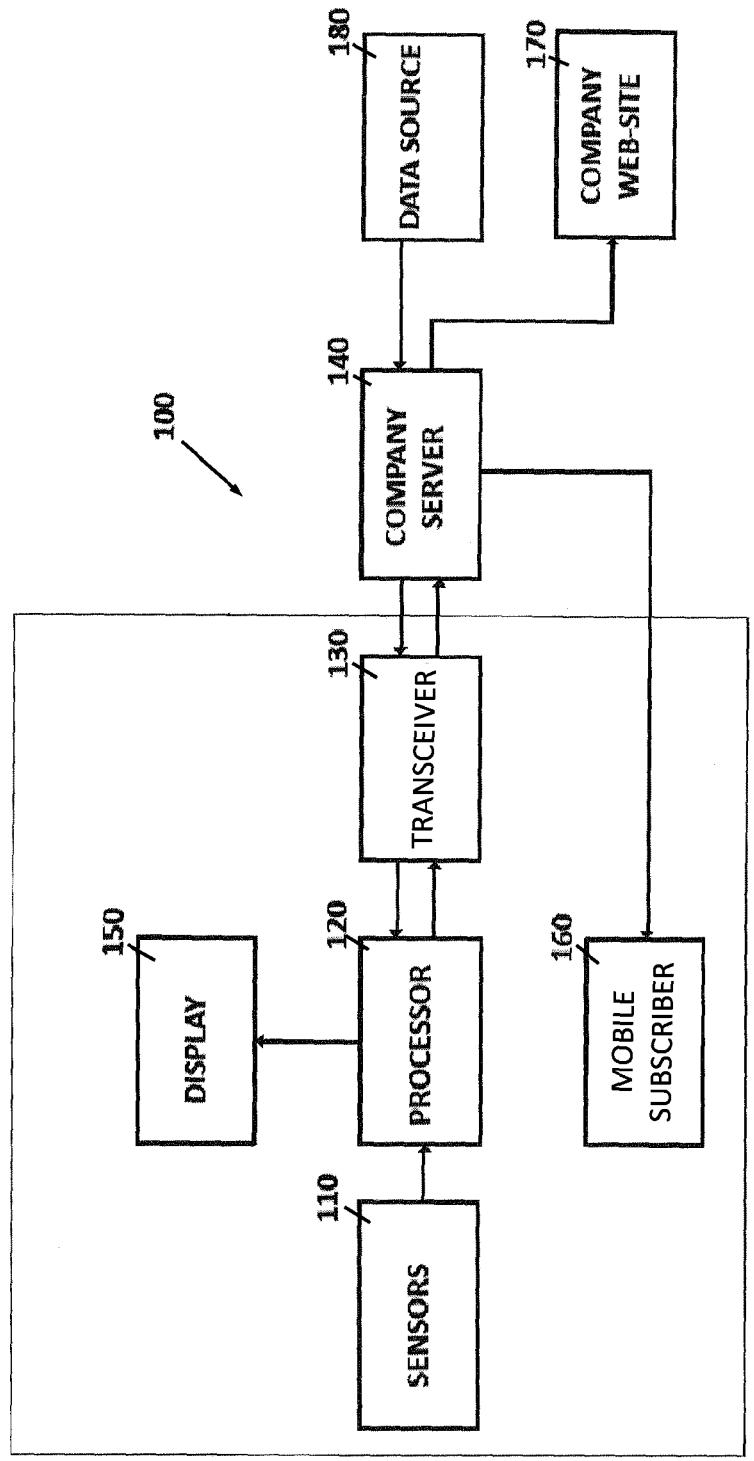
FIG. 1—illustrates a schematic overview of a system's architecture.

FIG. 1 illustrates a schematic representation of a system 100 operative to evaluate the fuel consumption efficiency based on the driver's driving performance. System 100 comprises two main parts. One part, 105, is a part comprised in the driver's vehicle and is basically directed for monitoring the driver's performance, whereas the remaining part of the system is external to the vehicle. Such a part for monitoring the driver's performance has been extensively described and exemplified in U.S. Pat. No. 7,389,178 which is hereby incorporated by reference in its entirety in order to avoid repetition of the '178 description.

The vehicle part 105 of the system comprises a plurality of sensors (110) which monitor the vehicle e.g. by collecting data regarding its speed, acceleration, location (GPS), engine RPM etc. Then, by using pattern recognition algorithms, the processor (120) processes the large amount of raw data retrieved from the sensors to meaningful observations, thus allowing the system to identify a set of driving events (e.g. lane changes, turns with and without acceleration, sudden brakes, strong accelerations, excessive speeds, etc). These events are preferably classified by their relative direction (to the left or to the right) and/or by their level of severity based on parameters of the detailed trajectory (e.g., maneuver duration, extent of sudden changes in speed and acceleration, and the speed they are performed at). The processed data may be transmitted wirelessly by transceiver (130) to the service provider's server (140), which maintains a database with vehicle-specific and driver-specific trip history that includes statistics of the vehicle usage patterns, recorded driving events and their severity ratings, etc. Upon executing fuel consumption analysis as will be further discussed later on, the service provider's server (140) transmits back to transceiver (130) recommendations for the driver on how to achieve a better fuel consumption efficiency, based on the driver's own driving performance. The recommendations presented to the driver through a designated display (150), and examples of such possible outputs are presented in FIG. 3. According to another embodiment of the present invention the service provider's server may transmit the recommendations directly to the driver's mobile telephone (160) either in a form of SMS or by pre-installing an application that supports the service provided by the service provider. Another possible option for the driver to receive information regarding his fuel consumption habits is by entering to the service provider's web-site (170), where each driver may check among other things, what are the preferred roads (and preferred times to use them) to be taken in order to reach his destination that will enable that specific driver, based on his own past driving performance, to achieve an optimized fuel consumption efficiency. According to another embodiment of the present invention the service provider's server (140) is connected to a number of data sources (180) which are capable of providing information that relates to factors that may influence the driver's performance and/or his habits which in return impact the vehicle's fuel consumption (city maps with area speed limits, weather forecast, traffic updates etc.)

Figure 2:
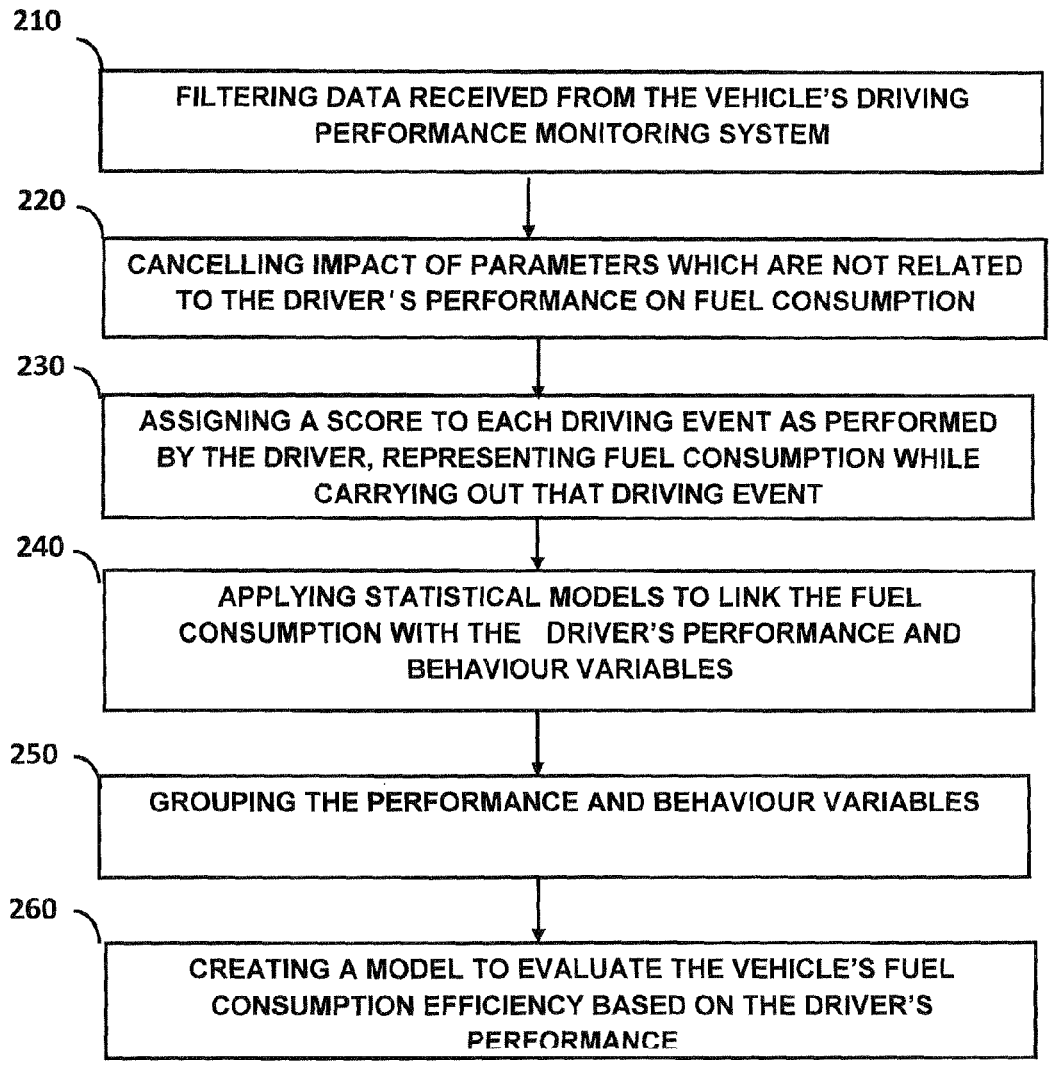
FIG. 2—is a flow chart demonstrating the fuel consumption analysis process.

FIG. 2 is a flow chart illustrating an example of a fuel consumption analysis process. It should be obvious to those skilled in the art that the present invention is not limited to this analysis process, one or more steps in the process may be skipped or be executed differently, but they are all encompassed within the scope of the present invention. By this example, the first step (210) is filtering data received from the vehicle's DPMS ("Driving Performance Monitoring System"). The filtering process aims to select the data that the system will focus on, since not all of the data received from the DPMS is related to driving events, and not all driving events identified by the DPMS are events that relate to fuel consumption. Upon filtering the data from the DPMS, the system cancels out the effect of parameters which are not related to the driver's performance but which still might influence the vehicle fuel consumption while carrying out a driving event (220) e.g. vehicle type and age, environmental conditions, fuel type etc. The system assigns each driving event as performed by the driver a score between 0 to 1 representing the fuel consumption of the driver's vehicle based on pre-stored data which is compare against the driver's performance of that very same driving event (230). The filtered data comprises information on the driver's driving performance of the various driving events as were carried out by the driver during a driving session (or any other period of time). Such driving events may be: braking, accelerating, braking which reaching a left turn, braking which reaching a right turn, accelerating when reaching a turn, accelerating while driving in a turn, braking while driving in a turn, sudden braking, accelerating while exiting turn, braking while exiting turn, lane crossing, etc. In order to be able to calculate accurately the influence of each of the above driving events (and others) on the fuel consumption, a trimming step of the performance variables is needed. The trimming step takes into consideration the number of occurrences that a certain event took place and in the driving timeframe, and produces a score (in the range of 0 to 1) for each driving event, generally when there are more events and less driving time the score is increasing. In addition to the driving events data, more information may be derived from the driving events data (the below variables are also normalized between 0 and 1 for later use): Time in excessive speed, Time percentage in economy speed, Speed inconsistency, Acceleration inconsistency, Percentage time in acceleration, number of stops, idling during a trip and the like.

The driving performance trimming process can be helpful not only for the statistical analysis but also for presentation to the users. The performance variables may function as indicators for fuel consumption, i.e. when the performance variable increases (i.e. more events per driving timeframe that are performed in a way that has an adverse effect upon fuel consumption), the fuel consumption increases accordingly. This data may be applied in statistical models in order to link between fuel consumption and the driver's performance variables (240). Such a model is described for example in the following Eq. 1:

$$Y = \frac{1}{(1 + e^{(b+cX)})} \quad (1)$$

Where
Y: normalized (0 to 1) fuel consumption;
X: normalized variables; and
b and c are coefficients.

It can be shown that the proposed function can be mathematically presented as follows:

$$\log\left(\frac{1}{Y} - 1\right) = b + cX \quad (2)$$

This function form is easier to handle by fitting parameterized algorithms because of its linear form.

In order to improve the efficiency of the statistical model, a step of grouping performance variables (250) is recommended, since there is only very little point to run the statistical model on two variables that would provide the same information. The proposed groups are preferably associated with the performance variables discussed above: braking, acceleration, turning, speed, lane change, percentage of zero speed. Thereafter, the last step (260) is creating the model for evaluating the vehicle's fuel consumption efficiency based on the driver's performance.

An example of a form of a fuel efficiency model is given by the following formula:

$$Y = \frac{1}{\left(1 + e^{\left(b_0 + b_1 Braking + b_2 Accelerating + b_3 Turning + b_4 speed + b_5 LaneChange + b_6 \% Zero\right)}\right)} \quad (3)$$

Where Y is the fuel consumption, $b_0$ to $b_6$ are the coefficients for the corresponding performance factors. Even though that the lane change variable is not as significantly correlated to fuel consumption as the other variables, it represents a certain behavior which is not captured by other variables, hence it was kept in the model applied in this example.

The method provided by the present invention takes into account the fact that the environment at which the driving session took place may have a substantial influence upon the driver's decisions and performance, and consequently each performance variable should be matched with its occurrence environment. For example, the number of turning events and braking events in an urban driving environment is expected to be higher than along highways. According to one embodiment of the present invention each driving event is attributed with its time and location (e.g. based on GPS data) to allow the service provider who analyzes the driving events and their impact on the fuel consumption, to correlate the events' data with data retrieved from other data sources e.g. speed limits, traffic updates, weather updates etc. and minimize (or preferably eliminate) the effect of any external data on the correlation between the driving performance of the driver and the fuel consumption.

Creating a statistical model that evaluates the fuel consumption of a vehicle based upon the driver's driving performances is only one aspect of the present invention. As aforesaid, the present invention also seeks to provide the driver with a fuel-related feedback in order to enable the driver to improve his vehicle MPG. The two main means for a driver to receive a fuel-related feedback are:

1. A display located inside the vehicle—the display presents a real-time feedback to the driver, thereby enabling him/her to improve his/her driving performance and reduce fuel consuming driving events. The display may either be a display installed at/near the front console of the car, or in the alternative, be the display of a hand held communication device of the driver such as a cellular phone, PDA, etc.

2. The service provider web-site—some of the information related to the driver's performance and other fuel consumption related data is stored at the service provider server, and is accessible to the driver (or any other authorized person) upon accessing the website and completing a standard identification procedure. In addition or in the alternative, a software application may be used to allow the driver (or any other authorized person) to access the information related to the driver's performance and other fuel consumption related data without having to navigate first to the service provider's web-site.

Figure 3:
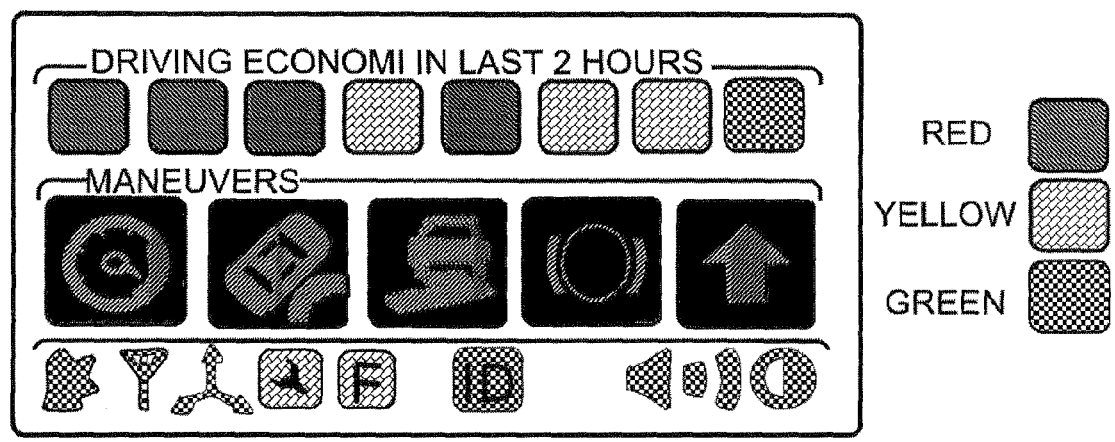
FIG. 3—illustrates an example of a display according to the present invention.
Figure 4A:
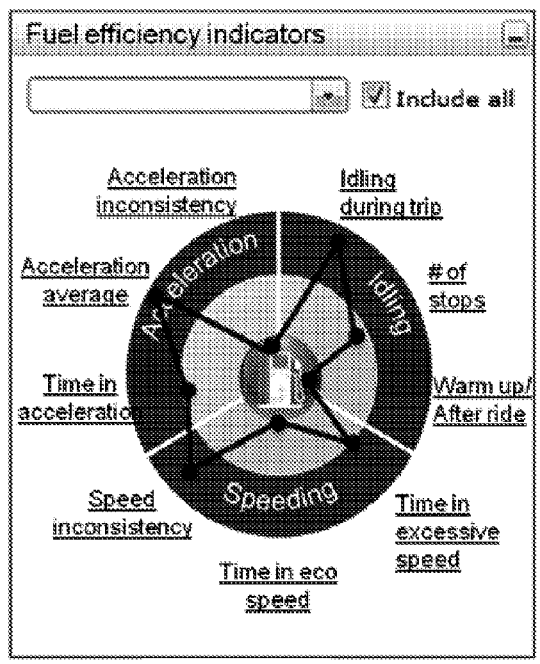
FIGS. 4A and 4B—demonstrate two options for presenting the fuel consumption efficiency according to selected indicators at the company web site.
Figure 4B:
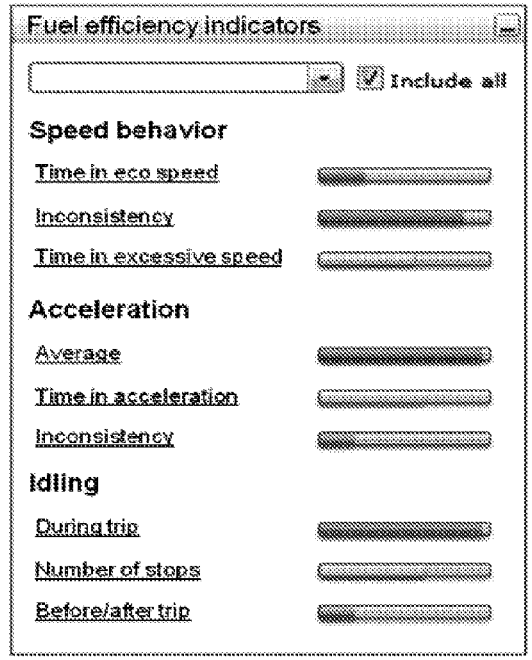
Figure 4C:
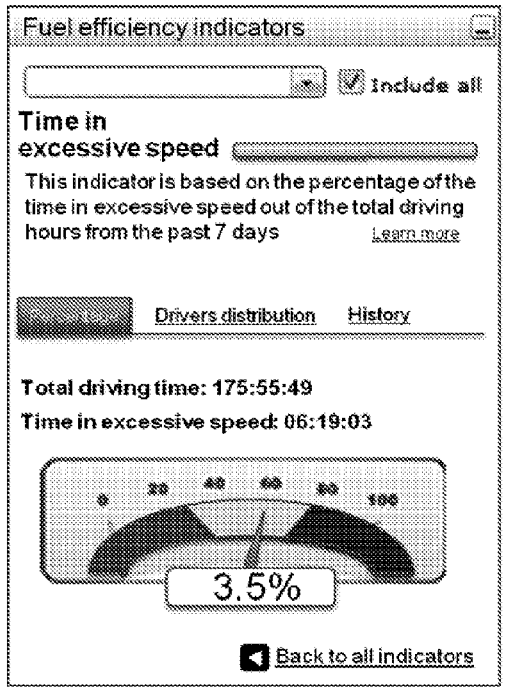
FIGS. 4C and 4D—demonstrate two options for presenting information associated with one of the indicators, at the company web site.
Figure 4D:
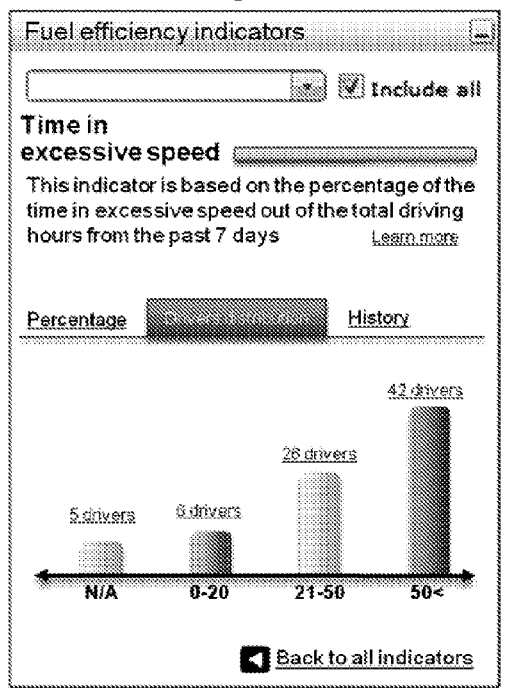

FIG. 3 provides an example of a display installed inside a vehicle. As can be appreciated by a person skilled in the art, the example illustrated in FIG. 3 is only one option out of many others of how to present the fuel-related information to the driver. Obviously, any version of a display adapted to provide the driver with fuel-related information should be understood as being encompassed with the scope of the invention.

FIG. 4 demonstrate examples of presenting the information stored at the service provider web-site. FIG. 4A demonstrates two options for visualized presentations of the fuel consumption efficiency according to selected indicators, whereas FIG. 4B demonstrates two options for presenting information associated with one of the indicators.

It is to be understood that the above description only includes some embodiments of the invention and serves for its illustration. Numerous other ways of carrying out the methods provided by the present invention may be devised by a person skilled in the art without departing from the scope of the invention, and are thus encompassed by the present invention.

The invention claimed is:

1. A method for evaluating fuel consumption efficiency of a vehicle driven by a driver, comprising:
   a. collecting data associated with said driver's driving performance from a plurality of sensors comprised in said vehicle;
   b. identifying, by a processor, a plurality of driving events based on the data collected and determining weighted effects of the driving events, wherein the weightings are based upon a specific driver's own performance, wherein each of the weighted effects is the impact of each of these events upon the vehicle's fuel consumption when the vehicle is being driven by said driver;
   c. estimating, by said processor, the driver's performance in at least one driving event from among the identified plurality of driving events, wherein that at least one event when poorly performed is associated with increased fuel consumption, taking into account the weighted effects; and
   d. based on the estimated driver's performance of the at least one driving event, making an evaluation of a fuel consumption efficiency of the vehicle driven by said driver and providing said evaluation as a readable output to said driver.

2. The method according to claim 1, wherein the method further comprises:
   e. providing said driver with real-time information associated with the vehicle fuel consumption based on the driver's performance.

3. The method according to claim 1, wherein the step of evaluating the fuel consumption efficiency of the vehicle driven by said driver, takes into consideration data associated with at least one of a location, time, traffic condition, and weather condition at which said at least one driving event took place.

4. The method according to claim 1, wherein said at least one driving event is a member selected from a group consisting of: braking, braking while reaching a turn, accelerating, turning, acceleration while reaching a turn, acceleration while driving in a turn, braking while driving in a turn, sudden braking in a turn, accelerating while exiting a turn, braking while exiting a turn, lane crossing, or any combination thereof.

5. The method according to claim 1, further comprising the steps of storing the evaluated fuel consumption efficiency of the vehicle driven by said driver, and providing said driver with data analysis and/or one or more recommendations regarding his driving performance based on said fuel consumption efficiency that had been stored.

6. A device for evaluating fuel consumption efficiency of a vehicle driven by a driver and comprising:
   a. a plurality of sensors comprised in said vehicle, adapted to collect data associated with said driver's driving performance; and
   b. a processor adapted to:
      (i) identify a plurality of driving events based on the collected data and based on the collected data and determine weighted effects of the driving events, wherein the weightings are based upon a specific driver's own performance, wherein each of the weighted effects is the impact of each of these events upon the vehicle's fuel consumption when the vehicle is being driven by said driver;
      (ii) estimate the driver's performance in at least one driving event that when poorly performed is associated with increased fuel consumption, from among the plurality of identified driving events taking into account the weighted effects; and
      (iii) evaluate the fuel consumption efficiency of the vehicle driven by said driver.

7. The device according to claim 6, further comprising a display means to enable providing the driver with real time feedback that relates to the vehicle fuel consumption based on the driver's performance.

8. The device according to claim 6, further comprising storage means for storing the evaluated fuel consumption efficiency of the vehicle driven by said driver, and wherein said processor is further adapted to provide one or more recommendations regarding the driver's driving performance based on said fuel consumption efficiency that had been stored.

9. A computer program product encoding a computer program stored on a non-transitory computer readable storage medium for executing a set of instructions by a computer system comprising one or more computer processors for carrying out a process for evaluating fuel consumption efficiency of a vehicle driven by a driver, and comprising the steps of:
   collecting from a plurality of sensors comprised in the vehicle, data associated with the driver's driving performance;
   identifying a plurality of driving events based on the data collected and determining weighted effects of the driving events, wherein the weightings are based upon a specific driver's own performance, wherein each of the weighted effects is the impact of each of these events upon the vehicle's fuel consumption when the vehicle is being driven by said driver;
   estimating the driver's performance in at least one driving event from among the identified plurality of driving events, wherein that at least one event when poorly performed, is associated with increased fuel consumption, taking into account the weighted effect; and
   based on the estimated driver's performance of the at least one driving event, evaluating a fuel consumption efficiency of the vehicle driven by the driver.

10. The computer readable medium according to claim 9, wherein the set of instructions further comprises instructions to provide the driver with real-time information associated with the vehicle's fuel consumption based on the driver's performance.

11. The method according to claim 1, further comprising identifying one of the driving events as carried out in a way that is wasteful fuel-wise, called a wasteful driving event, and if said wasteful driving event could not have been avoided, canceling said wasteful driving event in making said evaluation of the fuel consumption efficiency.

12. The device according to claim 6, wherein said processor is adapted to identify one of the driving events as carried out in a way that is wasteful fuel-wise, called a wasteful driving event, and if said wasteful driving event could not have been avoided, said processor is adapted to cancel said wasteful driving event in evaluating the fuel consumption efficiency.

13. The computer readable medium according to claim 9, wherein the set of instructions further comprises instructions to identify one of the driving events as carried out in a way that is wasteful fuel-wise, called a wasteful driving event, and if said wasteful driving event could not have been avoided, to cancel said wasteful driving event in evaluating the fuel consumption efficiency.

* * * * *